United States Patent
Reynolds

[19]
[11] Patent Number: 5,889,550
[45] Date of Patent: *Mar. 30, 1999

[54] CAMERA TRACKING SYSTEM

[75] Inventor: Mark C. Reynolds, Concord, Mass.

[73] Assignee: Adaptive Optics Associates, Inc., Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 661,201

[22] Filed: Jun. 10, 1996

[51] Int. Cl.$^6$ ...................................................... H04N 7/18
[52] U.S. Cl. ........................... 348/139; 348/169; 348/722; 702/153
[58] Field of Search .................................. 348/42, 94, 95, 348/139, 169, 722, 135, 143; 345/158; 364/559; 901/47; 702/150, 151, 152, 153; 356/139.03, 152.3; H04N 7/18, 13/02

[56] References Cited

U.S. PATENT DOCUMENTS

| | | | |
|---|---|---|---|
| 4,396,945 | 8/1983 | DiMatteo | 348/139 |
| 4,488,173 | 12/1984 | Di Matteo | 348/139 |
| 4,691,446 | 9/1987 | Pitches | 901/47 |
| 4,789,940 | 12/1988 | Christian | 901/47 |
| 5,227,985 | 7/1993 | DeMenthon | 364/559 |
| 5,396,331 | 3/1995 | Kitoh | 364/559 |

OTHER PUBLICATIONS

Thesis, Diploma & Sjoberg, Magnus, "Different Calibration Methods for a CCD Camera Based 3D Motion Analysis System—Implementation, Testing and Comparison", Goteborg, May 1993, pp. 1–44.

*Primary Examiner*—Howard W. Britton

[57] ABSTRACT

A camera tracking system determines the three dimensional (3D) location and orientation of the film plane of a camera providing live recording of a subject, thereby defining a 3D coordinate system of the live action scene into which animated objects or characters may be automatically mapped with proper scale and 3D visual object by a computer animation system.

18 Claims, 4 Drawing Sheets

CAMERA TRACKING SYSTEM

TECHNICAL FIELD

This invention relates to the field of cinematography, and more particularly to a system for identifying the spatial position of the film plane of a camera relative to its filmed subject.

BACKGROUND ART

Conventional film making technology has been revolutionized in recent years by advances in animation and in computer generated images. One of the first processes developed to combine live action with artificial environments was the use of a "blue screen". With this process a live performance is filmed against a blue background, and the background is then photographically replaced with art, inserts or animated characters which then become integrated with the filmed live action.

The animated motion picture "Who Framed Roger Rabbit" was produced with a variety of animation processes, including the blue screen process, and is considered a film animation landmark because of its realism. As may be known, the difficulty of integrating live actors into a bluescreen artificial environment, or of integrating animated characters into live action footage, is the matching of the three dimensional object of the live and artificial action to each other. Human visual acuity is sufficiently precise to detect millimeter offsets in the relative scale, positioning, and dimensional object of the live actor to the animated character. These relative characteristics must be accurately matched to obtain realism and present the viewer with a seamless view of the composite image. If the human actor is to be seen shaking hands with the animated character, then precise relative location of that character is essential to prevent having the two figures overlap or to miss one another.

In "Roger Rabbit" precision matching was achieved by building a composite image, frame by frame, from layers of filmed live action and computer generated images to visually present the animated characters in proper three dimensional object with their companion human actor. If there were only a single frame of action in which an interchange occurred the composition process could be done manually. However there is typically several minutes, or at least seconds, of exchange between the human and animated actors which, at a viewing speed of 24 frames per second (fps) equates to dozens or even hundreds of frames of film.

Since extreme precision in composition is required for realism, and since Roger Rabbit included several minutes of filmed action in which the human actors and animated characters are moving, the composite imagery required an extensive amount of manual labor, and cost. At present the only reliable way of doing this is to use a large amount of labor to do composition manually. There exists, therefore, a need for both method and apparatus which can identify the location of the filmed live elements within the context of a three dimensional setting so to allow automatic determination of the scale and position of the animated elements to be composed within the live scene. Ideally, this must be accomplished in a noninvasive manner, so as not to introduce unwanted elements into the film environment which must later be removed.

DISCLOSURE OF INVENTION

An object of the present invention is to provide method and apparatus for determining the three dimensional spatial coordinates of the film plane of a camera providing visual recording of subjects on a three dimensional film stage. Another object of the present invention is to provide apparatus for identifying the three dimensional object of subjects being visually recorded by a camera on a three dimensional film stage.

According to the present invention a camera tracking system includes a motion capture system for recording two dimensional ("2D") projections of the recording camera's location in three dimensional ("3D") space using a plurality of viewer cameras positioned at different sightlines around the recording camera and which track the 3D position of a patterned geometric target mounted to recording camera, the 2D projections are recorded in successive sample intervals, beginning from a calibrated reference position of the camera, the sample intervals having a periodicity at least equal to the recording intervals of the recording camera to associate each recording interval with at least one set of 2D projection data, the calibrated reference position of the camera being established with a calibration procedure performed prior to the recording session to provide a baseline position from which all subsequent camera motion is measured in relation to, the tracking system thereafter analyzing each sample interval's 2D projections from each viewer camera to calculate a result set of 3D coordinate data for each recording interval (e.g. film frame), whereby the 3D visual object of the subjects being recorded may be readily determined relative to the calibrated reference location.

In further accord with the present invention, the system converts each set of 2D data to a result set of 3D coordinate data through a photogrammetry mathematical process. In still further accord with the present invention, the patterned geometric target includes a plurality of light reflective markers, each assembled at known coordinate locations within the geometric structure of the target assembly, the coordinate positions of each marker being used by the system as the object data set in the mathematical transformation of the 2D projections to the result set of 3D coordinates.

The prior art animation process was to iterate the animated character's scale and position to make it fit the object and scale of the human actor. This had to be done frame by frame. The present invention still requires that the initial frame associated with the calibrated reference position be scaled by manual composition to make the seamless fit, however, thereafter the relative change in the recording camera's 3D orientation as detected by the present camera tracking system invention would allow subsequent object and scale of the animated character to be scaled automatically, as appropriate relative to the initial insert frame, thereby saving substantial animation time and cost. Alternatively stated, the recording camera's 3D location and orientation defines a 3D coordinate system. If the three dimensional location of the camera is known at all times then it becomes possible to insert artificial static or dynamic elements into the live action scene by mapping them into this coordinate system. This is an operation which can now be done by the computer animation system itself. The first step in this process is to precisely locate the film camera(s) themselves The present system provides accurate 3D tracking of the recording camera in a non-invasive manner. It does not introduce visual artifacts in filming, nor does it impose any significant constraints on the placement, orientation or operation of the recording camera. In particular, handheld cameras must be accommodated. The output of the tracking system must provide sufficient information to uniquely locate the camera in three dimensional space. In addition, it is highly desirable that the tracking produce its results in "real time". In this case this means that the track output data can be used to drive a display showing some representation of the composite live action and artificial elements.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
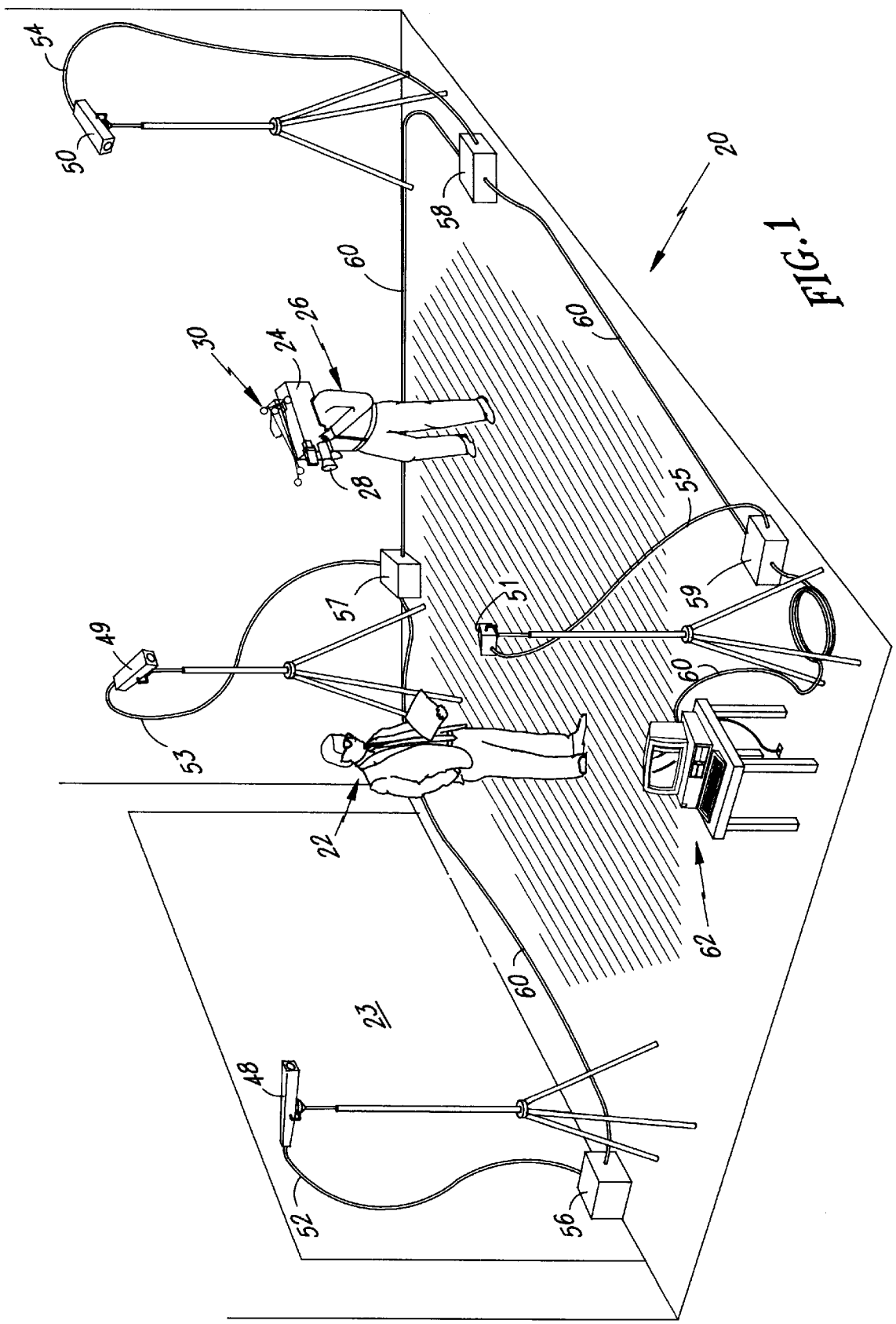
FIG. 1, is a figurative illustration of the apparatus of the present invention being used in a film stage setting.

FIG. 1 illustratively depicts a film stage 20 in which a human actor 22 is filmed in front of a blue screen 23 with a known model type camera 24 by an operator 26. As the actor 22 (the "filmed object") moves around the set the operator 26 continuously repositions the camera 24 to keep the filmed object within the field of view of the lens 28. Although the present invention may be used with any type of camera, such as a track mounted or boom mounted model, the best mode embodiment is described in terms of a portable camera, which has an unrestricted range of motion and, therefore, represents the greatest test of the invention.

As described in detail hereinafter, the camera tracking system of the present invention captures the three dimensional ("3D") motion of the camera 24 in successive two dimensional ("2D") projections, and converts the 2D projection coordinates into a 3D coordinate value set for the target assembly. The 2D projections is recorded with a time periodicity which is not less than the nominal 24 fps film viewing speed, such that each frame of film has at least one associated 3D coordinate value defining its position and 3D object within the recorded field of view. This allows artificial elements to be inserted into the recorded scene with proper 3D object and scale by mapping them into this coordinate system through a general mathematical process known as photogrametry.

The major elements of the present invention include: (i) a target assembly mounted to the camera 24, (ii) a motion capture system, having a plurality of viewer cameras, which record the real time 3D motion of the target assembly as 2D projections, (iii) a calibration procedure which defines the relative spatial positioning of the motion capture system to the target assembly, and (iv) tracking software which converts the recorded 2D projections into real time 3D spatial coordinates of the target assembly. The 3D coordinate information provided by the tracking algorithm is descriptive of the camera's position and orientation, and may be presented in a various formats, including: (1) the normal vector to the film plane of the camera; or (2) the Euler angles (the angular coordinates $\angle\alpha$, $\angle\beta$, and $\angle\delta$ corresponding to the pitch, yaw, roll) of the film plane of the camera with respect to a reference (calibrated) position; or (3) mathematical representation(s) of the transformation between the initial (calibrated) position/orientation of the camera and its current position, such as the rotation matrix or the "rotator" quaternion.

Target Assembly

Figure 3:
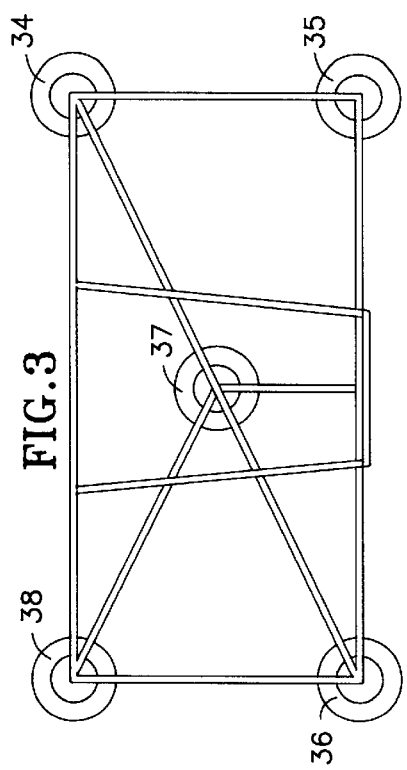
FIG. 3, is a plan view taken along the line 2—2 of FIG. 2.
Figure 2:
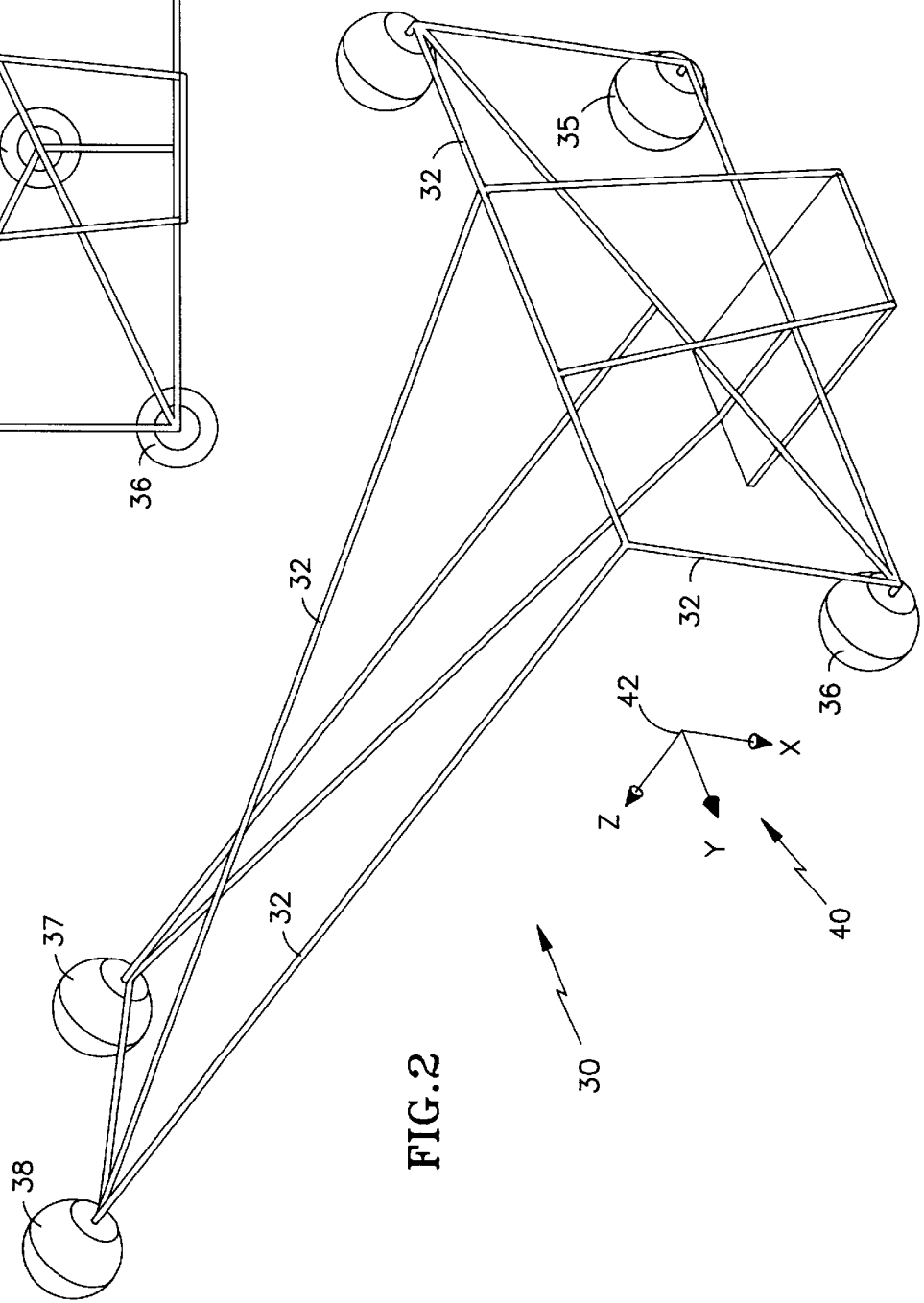
FIG. 2, is an isometric illustration of one element of the apparatus of FIG. 1.

In FIG. 1, the camera 24 includes a camera mounted target assembly 30, which is shown in detail in FIGS. 2 and 3. In the best mode embodiment the assembly 30 is a substantially precise 3D geometric shape comprising an open grid structure of support struts 32 which fixedly position a plurality of light reflective markers, such as the markers 34–38, at specific locations within the absolute coordinate system defined by the assembly's structure. The markers are generally spherical shapes, which are covered with a known type light reflective material, such as SCOTCHLITE™ 8710 reflective transfer film manufactured by the 3M Company. However, any other reflective material having similar reflective brilliance characteristics may be used, as known to those skilled in the art.

The target's geometric shape is defined by the number and coordinate position of the reflective markers. The minimum number of markers required is three, since three points are required to define the 3D position of the camera film plane. However, since camera position may cause one marker to occlude another from the sightline of the motion capture system, four or more markers are preferable. In the best mode embodiment, five markers 34–38 are chosen as an optimal balance between tracking accuracy and computational complexity.

Once the number of markers is selected the marker coordinates are selected with consideration given to the following.

1. The marker placements within the target structure are chosen such that if four or more marker locations are known in 3D space, then errors in the detected position or identity of the markers can be detected and corrected.
2. To provide computational simplicity the marker coordinate values are chosen such that if written in homogeneous coordinate format any four vectors may be assembled into an invertible 4×4 matrix.
3. At least three markers should be located in a plane parallel to the film plane.

In the best mode embodiment, the five markers 34–38 shown in FIGS. 2, 3 have the homogeneous coordinates listed in Table I below. The coordinate values may be best understood by reference to the three axis coordinate system illustration 40 in FIG. 2, where it is assumed that marker 34 is positioned at the coordinate origin 42.

TABLE I

| Marker No. | x | y | z | w |
|---|---|---|---|---|
| 34 | 0 | 0 | 0 | 1 |
| 35 | 1 | 0 | 0 | 1 |
| 36 | 1 | 2 | 0 | 1 |
| 37 | 0.5 | 1 | 3 | 1 |
| 38 | 0 | 2 | 3 | 1 |

Figure 4:
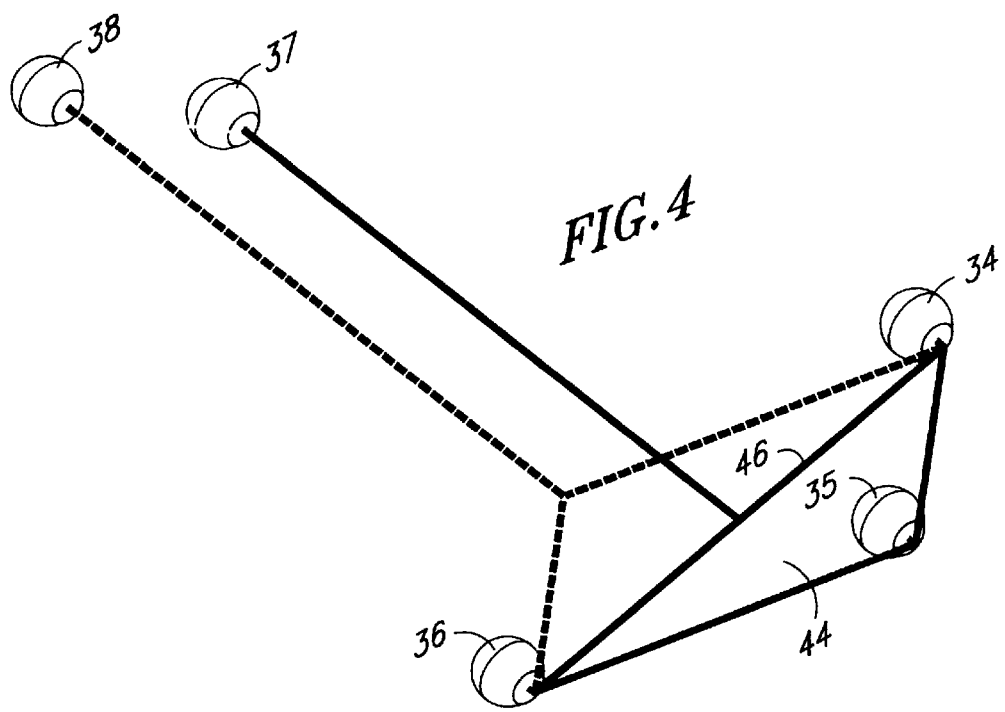
FIG. 4, is an abstract illustration of the element of FIGS. 2, 3, which is used in the description of the invention.
Figure 5:
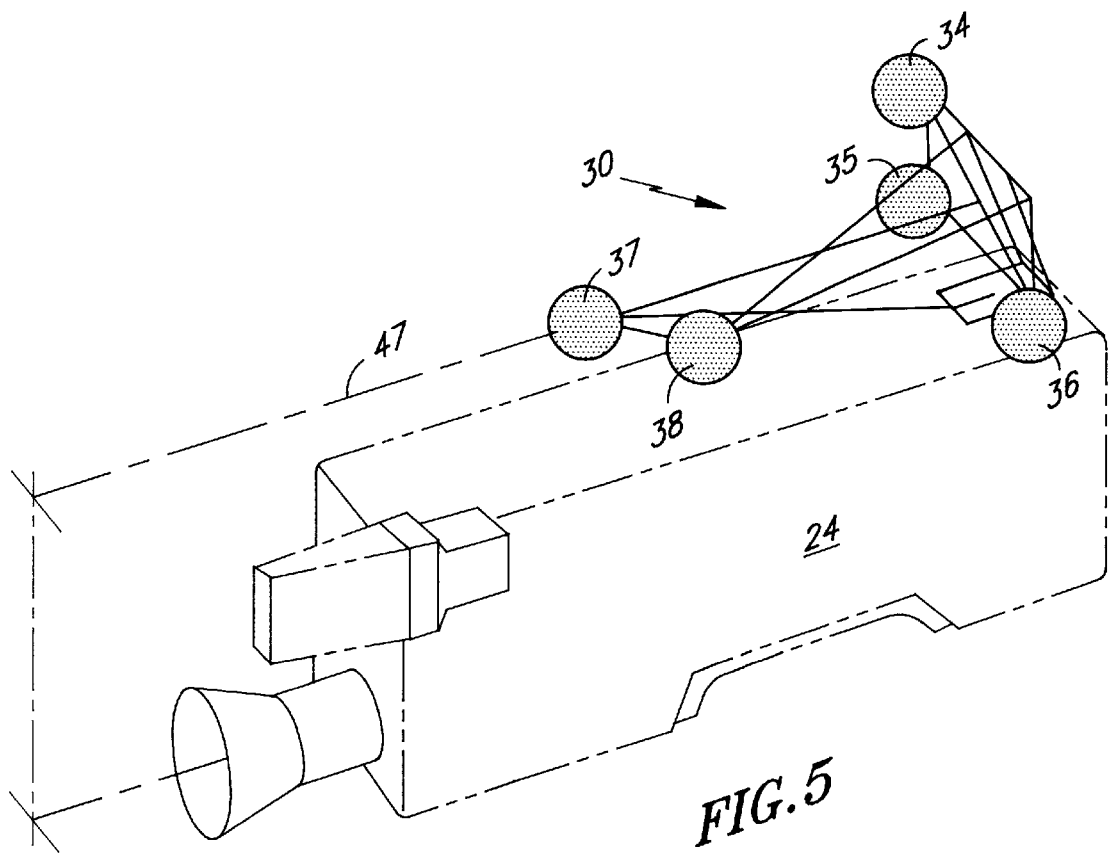
FIG. 5, is an illustration of a functional feature of the element illustrated in FIGS. 2,3.

Referring simultaneously to FIGS. 4, 5, the target assembly 30 is adapted to be mounted to a visible portion of the camera 24. Typically this is the top surface of the case, away from the camera controls. For a given camera model, the mounted target position is then calibrated to the position of the camera's film plane. Referring to FIG. 4, in an abstract illustration of the target assembly 30, the vector between markers 34, 35 defines the x axis and the vector between markers 35, 36 defines the y axis of the target's absolute coordinate space. The three markers 34–36 in combination substantially define a right triangle 44 which, with proper target mounting, lies parallel to the film plane. The fourth marker 37 defines the z axis of the absolute coordinate space, extending from the hypotenuse 46 of the triangle 44 in a substantially normal direction 47 to the film plane. The fifth marker 38 also projects along the z axis, from the plane of the right triangle 44.

In the target's grid structure, the metal struts 32 are preferably covered with a black anodized material to minimize stray light reflection. It is not necessary that the grid structure be absolutely rigid along all possible deformation axes. The kinematic motion imparted to the target as the camera moves may effect the accuracy of the system's 3D reconstruction, but this is mitigated both by the relative rigidity of the target's base (the right triangle 44 formed by markers 34–38) and by the demagnification effect of the system. i.e. since the motion capture system cameras are located several feet from the target, small flexure deformations in marker position do not give rise to appreciable error.

One very important point about the target is the question of scale size. In the best mode embodiment of the target assembly 30 the x axis dimension, i.e. the length of the vector from marker 34 to marker 35 was chosen to be 3.75 inches. The markers 34–38, which are substantially spheres, have a nominal diameter of one inch. These choices were dictated by the size discrimination algorithm (described below), the desired accuracy of the system (determined by the viewer resolution at a typical distance to the camera 24) and the relative size of the target assembly 30 and the camera 24.

The present camera tracking system software incorporates the absolute coordinates of the target assembly markers 34–38 in a single data structure, which is preferably a 4×5 matrix. If the marker coordinates of a given target assembly deviate from the nominal they can be recalibrated and the new marker coordinate data inserted into the software in such a way that the software function is not effected. If, for example, the coordinates of marker 36 were determined by measurement to be 0.97 2.02 0.01, rather than the specified 1 2 0 then this fact is accommodated by replacing row three of that matrix by the entry [0.97 2.02 0.01 1.00]

Motion Capture System

The present invention uses a known type motion capture system, such as the MULTI-TRAX™ motion capture system manufactured by Adaptive Optics Associates, Inc., Cambridge, Mass. The MULTI-TRAX™ system provides real time 2D and 3D multi-object tracking using up to seven video cameras (referred to as "viewer cameras") which are positioned around the target. Each camera provides pulsed infrared LED illumination of the target's passive reflective markers 34–38 and records 2D plane geometric projections of the reflected light patterns. The camera's video processor organizes the camera pixel data and forwards it to the system's main signal processor which determines the X1,Y1 coordinates of each recorded 2D marker projection and calculates a result set of 3D coordinates for each marker. Each 3D result set has three unknowns (x, y, z,), requiring at least two 2D projections (4 knowns and 3 unknowns) and, therefore, at least two viewer cameras.

In the present invention, however, two viewer cameras are insufficient to ensure an unoccluded view of the markers; instead requiring at least three viewers. In addition, obstructions on the film set 20 (furniture, position of actors, etc) may block one viewer camera's sightline to the target, and the possibility of target positional ambiguity (the inability of a viewer camera to discriminate between position of different markers in certain target orientations) makes four viewers preferable. Of course the complexity of a given film set scenery may require additional viewers, up to the system maximum of seven.

Figure 6:
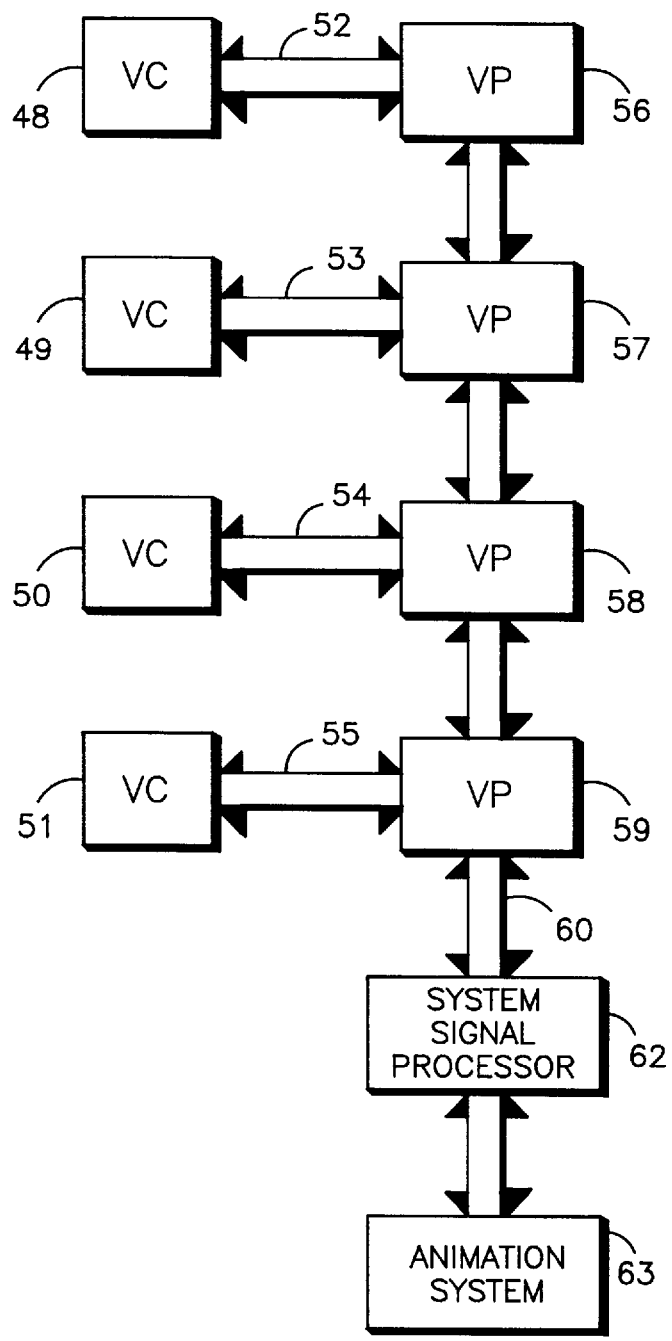
FIG. 6, is a schematic illustration of another element of the apparatus of FIG. 1.

In the best mode embodiment of the present invention four viewer cameras are used. As shown illustratively in FIG. 1 and in schematic block diagram form in FIG. 6, four viewer cameras 48–51 (hereinafter referred to as "viewer cameras") placed in a surround pattern to the film stage 20 and positioned, in terms of location and height, to achieve maximum visibility of the target assembly 30. The target assembly is mounted to the camera case in a location most visible to the viewer cameras. Typically this is the top surface of the case, away from the camera controls. For a given camera model, the mounted target position is then calibrated to the position of the camera's film plane.

As described briefly hereinbefore, the MULTI-TRAX™ system viewer cameras 48–51 are pulsed infrared optical cameras capable of providing real time 3-D tracking of light reflective targets at indoor distances up to 30 meters and at sample rates of 50–350 Hz. The camera's infrared strobe provides a light intensity of up to 15 watts/m$^2$ at one meter. In the best mode embodiment the viewer cameras provide a 60 Hz sample rate, which is capable of processing 2D projections for up to 40 markers. The 2D projection data from the viewer cameras 48–51 is provided through an associated one of buss lines 52–55 to a related one of a like plurality of video processors 56–59.

The video processors 56–59 are serially interconnected through each processor's RS-422 communication port by a cable buss 60 to the camera tracking system's main signal processor 62. The maximum baud rate for the transfer of data between the video processors and the main signal processor is 500,000. The signal processor, which may be a commercially available, DOS based PC with an INTEL® PENTIUM® microprocessor, includes a standard full keyset keyboard and a standard SVGA monitor with a 256 color video driver. The system signal processor 62 may be connected directly to the end user animation system 63, which may be anyone of a number of computer based animation systems, as known to those skilled in the art.

The system processor 62 and video processors 56–59, in a tracking system having a five marker target assembly and four viewer cameras, must be capable of analyzing all possible combinations of the five sets (for 5 markers) of 2D coordinates form each of the four viewer cameras, or $5^4$=625 possible 3D film frame coordinates solution sets. Typically, however, as described in detail hereinafter with respect to the system's Tracking Algorithm, far less than the maximum possible 625 solutions are reviewed before a "best case" value set is chosen as the 3D result. Ideally the 3D solution set is provided at the rate of 90 fps, which is 150% faster than the typical recording film speed of 60 fps, and over 360% faster than the normal viewing speed of 24 fps.

The Calibration Procedure

The camera tracking system of the present invention does not calculate the actual spatial position of the film plane of the camera 24 within the overall coordinate system of the film stage 20. Instead, it tracks the change in film plane position relative to an initial calibration coordinate reference obtained during the calibration process. The actual value of this calibration reference is the 3D coordinate value of marker 34 as viewed by each of the viewer cameras during the calibration process. This actual 3D value is assigned a relative value of x=0, y=0, z=0 from which all 3D solution sets are measured until the next calibration is performed. Typically, calibration is performed prior to filming any new scene which alters the film stage setting.

The calibration procedure establishes this reference coordinate for each viewer cameras in respect of how that viewer camera "sees" the target. The actual location of a viewer camera on the stage 20 (the "spot location") is immaterial. What is important to the system are the differences in viewer camera locations, which will cause each viewer to have a different view of the target and a corresponding different absolute calibration coordinate solution set for marker 34. Whatever that actual value, it becomes the 0,0,0 calibration reference for that viewer. Each viewer's individual view is established by the "Calibration Projection Matrix" created for each viewer on the basis of (i) the Observed Data or "Obs", which is the 2D visual data received and formatted by each viewer/video processor pair, and (ii) the Object Set, which is the known coordinate positions of the target markers 34–38 on the target assembly. All subsequent data sets then provide data relative to the calibration data set which is stored in the system computer.

The calibration process uses the target assembly as the calibration target. The target assembly is maintained in a steady position, and each viewer camera is adjusted as necessary to see at least four of the five target markers 34–38. Each video processor computes the 2D data from the pixel data provided by its associated viewer camera. The 2D data is correlated to each of the viewed markers by having the operator block each marker, one at a time to make the association. The system processor 62 then calculates each of the viewer cameras 2D projection matrices.

To demonstrate the operation of the calibration process, assume that the four markers seen by viewer camera 48 are 34, 35, 37, and 38. The viewer 48 and its video processor 56 produce four two dimensional vectors D1, D2, D3 and D4, which can be considered three dimensional coordinates with z=0. The 3D coordinates are then placed in homogenous coordinates to provide a 4×4 matrix of Observed Data (Obs):

$$\begin{vmatrix} D1x & D1y & 0 & 1 \\ D2x & D2y & 0 & 1 \\ D3x & D3y & 0 & 1 \\ D4x & D4y & 0 & 1 \end{vmatrix}$$

In homogeneous coordinates a third coordinate (W) is added to every coordinate pair (x, y) in a 2D system to become (x, y, W), or to every triple (x, y, z) in a in a 3D system to become (x, y, z, W). If W is nonzero we can "homogenize" the 3D (or 2D) point by dividing through by W, such that (x, y, z, W)=(x/W, y/W, z/W, 1), which is represented generally by the form (tx, ty, tz, tW), where: t=1/W The Observed Data values in the above 4×4 matrix are obtained by multiplying the absolute coordinate values of the Object Set by the projection matrix (T). This can be expressed by the matrix equation as:

$T \times $Object Set=Observed Data

The Object Set is known since the absolute coordinates of markers 34, 35, 37, and 38 within the target assembly are known. Therefore, in this example Object Set is equal to:

$$\begin{vmatrix} 0 & 0 & 0 & 1 \\ 1 & 0 & 0 & 1 \\ 0.5 & 1 & 3 & 1 \\ 0 & 2 & 3 & 1 \end{vmatrix}$$

Since, as described hereinbefore with respect to the target assembly description, the Object Set matrix is invertible. If the inverse of Object Set is denoted as I*Object Set then the projection matrix T for viewer camera 48 is easily computed as $T=$Obs$\times I*$Object Set A similar computation must be performed for every viewer camera. It is not necessary that each camera see the same set of markers. The output of the calibration procedure will be a projection matrix for each viewer camera. The projection matrices will all have the form:

$$\begin{vmatrix} x & x & 0 & 0 \\ x & x & 0 & 0 \\ x & x & 0 & 0 \\ x & x & 0 & 1 \end{vmatrix}$$

where "x" denotes a typically nonzero entry.

where "x" denotes a typically nonzero entry.

This form of calibration has several distinct features. The primary feature is the fact that the system's target assembly itself defines the world coordinate system. Calibration serves to fix the cameras in the target's coordinate system, by means of defining its Calibration Projection Matrix, rather than determining the camera's coordinates themselves. Second, the absolute scale of the target is not used in this approach, because each projection matrix views the 34→35 vector as having length one, regardless of its actual length. The scaling between physical size (the actual length of the 34→35 vector) and the target world coordinate system is contained within the projection matrices. Third, any target can be used so long as it satisfies the target constraints as defined above (and provided that the target 4×5 definition matrix has been loaded into the calibration software).

Tracking Algorithm

The calibration procedure takes place with the target (and the motion picture camera to which it is mounted) stationary and serves to fix the coordinate system. Once the user has designated that tracking is to begin the track algorithm is entered. The track algorithm takes the reported two dimensional coordinate data from each of the viewer cameras and attempts to reconstruct the three dimensional positions of a subset of the five markers sufficient to calculate one or more of the film plane representations.

The track algorithm has to contend with a number of factors, including:

(a) the order of marker data presented by each viewer camera will be raster order, and not necessarily marker order (as was the case with calibration);

(b) any given viewer camera may not see a given marker because that marker is obscured. In particular, some viewer cameras may present no data at all for several frames, because, for example, one of the human actors is interposed between the viewer camera and the target;

(c) any given viewer camera may see two (or more) markers as a single marker, because the 2D projections of those several markers is the same;

(d) any given viewer camera may see a single marker as two (or more) markers. This can arise, for example, because one of the support struts of the target is interposed between the viewer and the marker, so that the viewer sees half of the marker, an obscured area, and then other half of the marker, with the two halves appearing as two separate markers;

(e) there may be spurious markers recorded as a result of reflections, or there may be other data errors introduced at any point in the data acquisition chain up to the time at which the track software receives it.

It is also required that the tracking software not be so computationally intensive that it cannot keep up with the incoming data, at least to the extent that it can provide output 3D positional data at the film rate, i.e. at 24 Hz (i.e. 24 fps). It is also extremely desirable that the tracker be robust to the extent that it can (a) provide a quality indicator as to the calculated likelihood that the computed track is correct, and (b) in cases when the computed track is suspected or known to be incorrect (such as total loss of data), that it can recover from such situations as quickly as practicable (i.e., as soon as data fidelity increases).

The camera tracking system of the present invention imposes the following restrictions in an attempt to meet these conditions:

(a) at least two viewer cameras must see at least three markers each at all times; and (b) during the track acquisition period (that period of twenty four frames after track was initiated) the velocity and acceleration of each marker must be bounded by an adjustable constant factor of the total displacement of that marker from its initial position.

The tracker algorithm operates in five basic steps:

(1) the 2D data for each viewer camera is compared against maximum and minimum size constraints (which may also be disabled individually or jointly). These constraints serve to eliminate certain obviously spurious data items, and also to reduce the number of split markers in the data stream. Although this can result in good data being discarded, the overall redundancy of the system is sufficient that this has not proven to be a problem;

(2) the 2 dimensional data for all viewer cameras is scanned, and based on how many markers each sees the viewer cameras are ordered from "best" to "worst";

(3) using the projection matrices for the two "best" viewers and the marker data for those viewers, all possible 3D reconstructed positions are computed using a mathematical process known as photogrammetry. With this process it is possible, with two or more viewer cameras, to reconstruct the bundle of rays that produced the 2D image in each different camera. By calculating the 3D intersection point of rays from the different 2D images, a 3D model of the object that formed the images can be constructed. This is sometimes referred to as the "photogrammetric problem". This 3D photogrammetric reconstruction may be performed by either one of two basic prior art methods known as the "direct linear transform" (DLT), or "the collinearity equations". The use of each method to solve the photogrammetric problem is described in detail in a Diploma Thesis entitled *Different Calibration Methods for a CCD Camera Based 3D Motion Analysis System—Implementation. Testing and Comparison*; presented by Magnus Sjoberg at the Chalmers University of Technology, Goteborg, Sweden, May 1993, and which is incorporated by reference herein, in its entirety.

If the first camera saw K markers, and the second saw J markers, then this would be K×J possible reconstructions. For two viewer cameras the maximum number of possible reconstructed positions is therefore $5^2=25$ 3D result sets, instead of the maximum possible 625. Restriction (1) above insures that this product will give a number of possible values which is large enough to contain the actual marker locations in almost all cases;

(4) the reconstructions are scored relative to each of the 5 desired marker positions. The initial score is computed based on the distance between each putative position and the known positions of the markers in the previous three frames (during the first four frames the absolute positions of the calibration are used). A scoreboard algorithm with weights is used so that once a 2D data point from one of the two viewer cameras is considered to be a likely candidate for a particular marker, it becomes a less likely candidate for other markers. In general, for the K by J situation noted above the ideal reconstruction will have at most one value chosen from each row and each column of the scoreboard;

(5) step four gives the first pass assignments of the new 3D locations of the markers. Using this it is possible to compute tentative values for the velocity and acceleration of each marker, since its positions (and velocities and accelerations) in the previous three frames are saved. Once this has been done the scoreboarding of step 4 is repeated, this time using an aggregate nine dimensional distance as the input score (3 components of position, 3 of velocity and 3 of acceleration). Restriction 2 insures that during the initial frames of tracking, when the track history is not stable, that large velocities and/or accelerations do not cause instability in the track algorithm. In mathematical terms this amounts to bounding the contribution of transients until the steady state regime is entered.

Tracks are assigned four grades: "high quality", "low quality", "no quality" or "track lost". A high quality track is one in which all markers were deemed to be successfully reconstructed. A low quality track is one in which at least three markers, but fewer than all five markers, were deemed to be successfully reconstructed. A "no quality" track is one in which some reconstructions took place and no error in the algorithm occurred, but the new marker positions are sufficiently few, or sufficiently far from the old ones that the output is not trusted. "Track lost" implies that either there was total data loss (restriction (1) above was violated), or an error occurred.

Note that if the result of step (5) for one particular camera pair was not of "high quality" or "low quality" then steps (2) through (5) are repeated for all other camera pairs until either one of these quality factors is achieved, or until all camera pairs are exhausted.

Given a high or low quality track it is possible to generate one of the stated output formats easily. The current coordinates of the known markers can be used to infer the location of the 123 plane (the film plane). The normal vector is then simply the cross product of the 1→2 and the 1→3 vectors. The "pitch" and "yaw" Euler angles can be computed from the normal using the procedure of [1, pg 217–218). The "roll" angle is obtained by coordinate transforming the 123 plane to be parallel to the z axis and then computing the angle between the base 1→2 vector (which is just the x axis) and the current 1→2 vector. This angle is just the inverse cosine of the dot product of those two vectors normalized to unity. The rotation matrix or the quaternion representation can then be derived.

The output of the present camera tracking system is a realtime representation of the film plane of the recording camera 24. This realtime information may be delivered in a variety of formats to suit the end-user animation equipment to which the system is connected. This end-user equipment may be a digital media or digital studio software system, such as GIGTIME™ model animation system from ELECTROGIG, Herengracht 214, 1016 BS Amsterdam, The Netherlands. Typically, the information would be delivered as either (a) the 3D coordinates of 34, 35, and 36, which define the plane of the right triangle 44 (FIG. 4) which is parallel to the film plane, or (b) as the Euler angles corresponding to the unit normal vector of this plane (the marker 37 (FIG. 4)). This data would be presented as 3 floating point numbers (e.g. IEEE floating point format) at the desired input rate of the end-user equipment. This frame rate would usually be either 24 fps (standard film rate) or the actual sample frame rate of the viewer camera.

The camera tracking system of the present invention tracks the location and orientation of the image plane of either a cinematographic or a video camera. Whichever type recording camera may be used, the present invention provides a 3D coordinate data set identifiying the spatial location of the recording camera image plane in each film frame or video frame.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

I claim:

1. Apparatus for providing, to user animation equipment, the three dimensional coordinate data identifying the location and orientation of the image plane of a recording camera which is visually recording subjects on a three dimensional film stage, comprising:

a target assembly, having a plurality of light reflective markers disposed in a geometric pattern thereon, said pattern including a target plane, said target assembly being adapted for mounting to the recording camera in a manner such as to position said target plane parallel to the film plane of the recording camera;

a motion capture system, having a plurality of viewer cameras and associated video processors, for recording the spatial location and orientation of said target assembly markers in each of a plurality of successive sample intervals with each of said plurality of viewer cameras; and for providing at an output thereof said recorded location and orientation as a two dimensional data set from each of said plurality of associated video processor in each said sample interval; and signal processing means, responsive to each said two dimensional data set from each said associated video processor in each said sample interval, for reviewing at least two of said two dimensional data sets in each said sample interval and for reconstructing therefrom a result set of three dimensional coordinate data for each said sample interval, each said three dimensional data set being indicative of the location and orientation of the film plane of the recording camera in its related sample interval.

2. The apparatus of claim 1, wherein said plurality of viewer cameras are placed in position around the recording camera, each at a different sightline to the target assembly.

3. The apparatus of claim 1, wherein said target assembly comprises:

a support structure, having a different one of a plurality of structural members thereof arrayed in each of three substantially orthogonal geometric planes, said support structure further having a mounting member adapted to mount said structure to the recording camera; and a plurality of light reflective markers arrayed in a known pattern among said plurality of structural members, at least one each of said plurality of markers being located in a different one of said three orthogonal planes, said plurality of markers being responsive to the pulsed light from the motion capture system viewer cameras to reflect a known three dimensional pattern of light.

4. The target assembly of claim 3, wherein said plurality of structural members comprise a light absorbent outer surface.

5. The target assembly of claim 3, wherein said light reflective markers are substantially spherical in shape.

6. The target assembly of claim 3, wherein said plurality of light reflective markers comprises at least three said markers.

7. The target assembly of claim 3, wherein said plurality of light reflective markers comprises at least five said markers.

8. The target assembly of claim 3, wherein said plurality of markers each have an exterior surface of SCOTCHLITE™ 8710 reflective transfer film.

9. The apparatus of claim 7, wherein said plurality of viewer cameras are positioned around the recording camera, at different sightlines to said target assembly.

10. The apparatus of claim 9, wherein each of said plurality of viewer cameras record 2D projections of the location and orientation of said target assembly in successive sample intervals, beginning from a calibrated reference position of the camera, the sample intervals having a periodicity at least equal to the recording intervals of the recording camera so as to associate each recording interval with at least one set of 2D projection data, the calibrated reference position of the camera being established with a calibration procedure performed prior to the recording session to provide a baseline position from which all subsequent camera motion is measured in relation to.

11. The apparatus of claim 1, wherein said signal processing means provides each said three dimensional data set using a direct linear transform mathematical process.

12. The apparatus of claim 1, wherein said signal processing means provides each said three dimensional data set using the collinearity equations mathematical process.

13. A target assembly, for use in a system of the type which uses a motion capture system, having a plurality of pulsed light viewer cameras for recording the spatial location and orientation of the image plane of a recording camera recording subjects on a three dimensional film stage, comprising:

a support structure, having a different one of a plurality of structural members thereof arrayed in each of three substantially orthogonal geometric planes, said support structure further having a mounting member adapted to mount said structure to the recording camera; and a plurality of light reflective markers arrayed in a known pattern among said plurality of structural members, at least one each of said plurality of markers being located in a different one of said three orthogonal planes, said plurality of markers being responsive to the pulsed light from the motion capture system viewer cameras to reflect a known three dimensional pattern of light.

14. The target assembly of claim 13, wherein said plurality of structural members comprise a light absorbent outer surface.

15. The target assembly of claim 13, wherein said light reflective markers are substantially spherical in shape.

16. The target assembly of claim 13, wherein said plurality of light reflective markers comprises at least three said markers.

17. The target assembly of claim 13, wherein said plurality of light reflective markers comprises at least five said markers.

18. The target assembly of claim 13, wherein said plurality of markers each have an exterior surface of SCOTCHLITE™ 8710 reflective transfer film.

\* \* \* \* \*